(12) United States Patent
Watkins

(10) Patent No.: US 11,037,073 B1
(45) Date of Patent: Jun. 15, 2021

(54) DATA ANALYSIS SYSTEM USING ARTIFICIAL INTELLIGENCE

(71) Applicant: Aperio Global, LLC, Reston, VA (US)

(72) Inventor: Damian Watkins, Reston, VA (US)

(73) Assignee: Aperio Global, LLC, Reston, VA (US)

(*) Notice: Subject to any disclaimer, the term of this patent is extended or adjusted under 35 U.S.C. 154(b) by 0 days.

(21) Appl. No.: 17/017,289

(22) Filed: Sep. 10, 2020

Related U.S. Application Data

(63) Continuation of application No. 17/013,106, filed on Sep. 4, 2020.

(51) Int. Cl.
| | |
|---|---|
| *G06N 20/00* | (2019.01) |
| *G06F 3/0484* | (2013.01) |
| *G06F 16/953* | (2019.01) |
| *G06N 3/08* | (2006.01) |

(52) U.S. Cl.
CPC ......... *G06N 20/00* (2019.01); *G06F 3/04847* (2013.01); *G06F 16/953* (2019.01); *G06N 3/08* (2013.01)

(58) Field of Classification Search
CPC ... G06N 20/00; G06F 3/04847; G06F 16/953; G06F 3/0484; G06F 16/332; G06F 16/9032; G06F 16/0035; G06F 16/0038; G06F 16/28; G06F 16/35; G06F 16/25; G06F 16/45; G06F 16/55; G06F 16/65; G06F 16/75; G06F 16/906; G06F 16/242
See application file for complete search history.

(56) References Cited

U.S. PATENT DOCUMENTS

| | | | |
|---|---|---|---|
| 7,043,500 B2 | 5/2006 | Leary | |
| 8,019,941 B2 | 9/2011 | Mann et al. | |
| 8,359,279 B2* | 1/2013 | Fisher | G06F 16/904 706/11 |
| 8,843,490 B2 | 9/2014 | Gazen et al. | |
| 9,043,326 B2 | 5/2015 | Wunsch, II et al. | |
| 9,336,302 B1 | 5/2016 | Swamy | |
| 10,089,581 B2 | 10/2018 | Flores et al. | |
| 10,671,884 B2 | 6/2020 | Walters et al. | |
| 2014/0358825 A1* | 12/2014 | Phillipps | G06N 20/00 706/11 |
| 2018/0018590 A1 | 1/2018 | Szeto et al. | |

(Continued)

FOREIGN PATENT DOCUMENTS

EP 2963577 A1 1/2016

*Primary Examiner* — Sanchita Roy
(74) *Attorney, Agent, or Firm* — Mark Terry

(57) ABSTRACT

A data analysis system utilizing custom unsupervised machine learning processes over a communications network is disclosed, the system including a repository of data, a web application deployed on a web server, the web application including a data collection interface, wherein the web application is configured for providing a graphical user interface for modifying threshold parameters of a clustering algorithm for clustering the data, executing the clustering algorithm with the threshold parameters that were modified, thereby producing a set of results, providing a graphical user interface for reviewing the set of results of the clustering algorithm and re-executing previous steps if the set of results are not useful and, executing a deep learning algorithm in a deep learning software framework on the set of results, thereby establishing relationships between the data, and providing generalizations of the data.

10 Claims, 5 Drawing Sheets

(56) References Cited

U.S. PATENT DOCUMENTS

| | | |
|---|---|---|
| 2018/0039946 A1 | 2/2018 | Bolte et al. |
| 2019/0155797 A1* | 5/2019 | Nath ..................... G06F 16/122 |
| 2020/0169565 A1* | 5/2020 | Badawy ................ H04L 63/105 |
| 2020/0183041 A1 | 6/2020 | Denli et al. |
| 2020/0251224 A1* | 8/2020 | Mavroeidis .......... G06N 3/0454 |

* cited by examiner

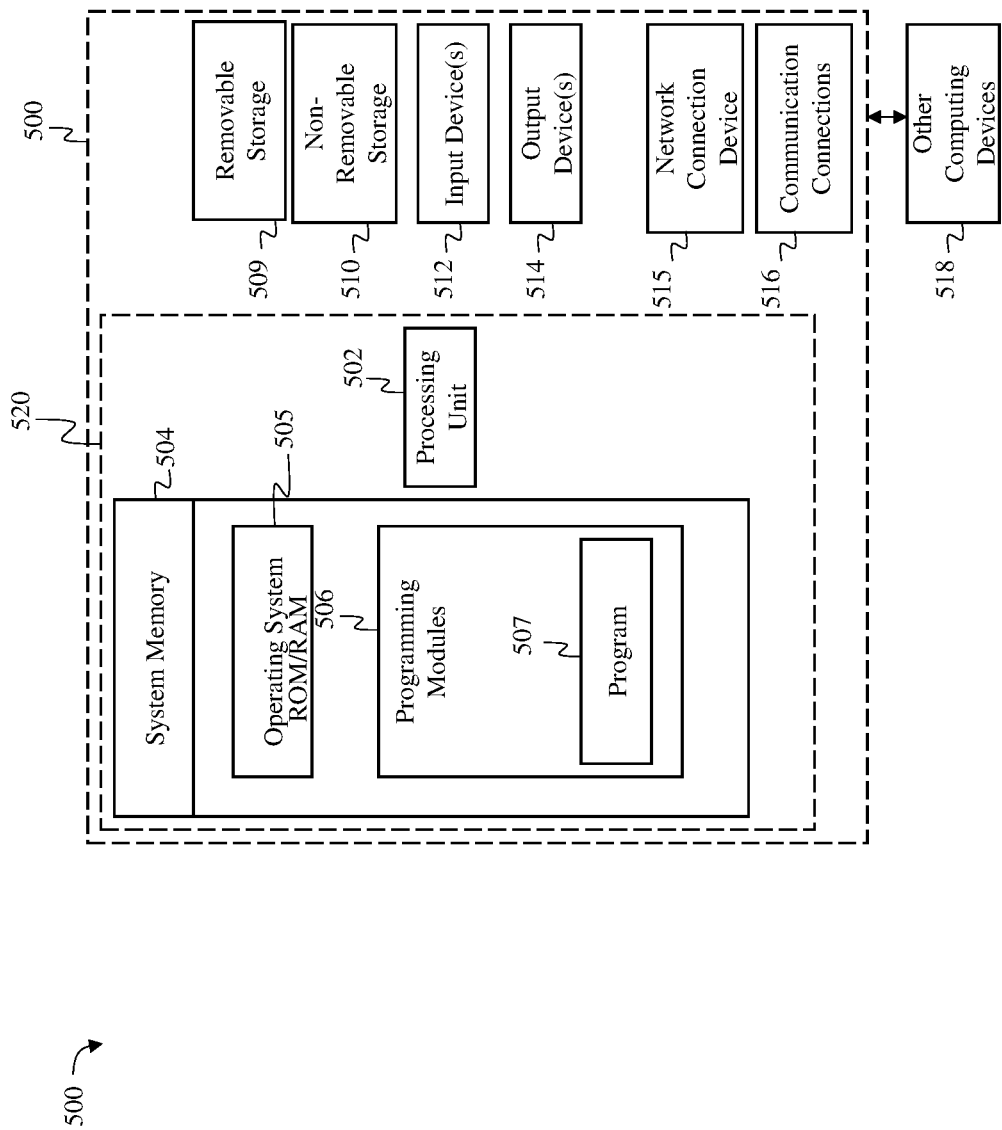

DATA ANALYSIS SYSTEM USING ARTIFICIAL INTELLIGENCE

CROSS-REFERENCE TO RELATED APPLICATIONS

This patent application is a continuation of, and claims priority to, patent application Ser. No. 17/013,106, titled "Data Analysis System Using Artificial Intelligence", filed on Sep. 4, 2020.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed subject matter relates to data analysis, and more specifically to the field of data analysis systems utilizing artificial intelligence.

BACKGROUND

With the onset of the Information Age—the historical period that began in the late 20th century, characterized by a rapid epochal shift from the traditional industry established by the Industrial Revolution to an economy primarily based upon information technology—vast amounts of data (sometimes referred to as "big data") have become available. To gain insight into said data, individuals traditionally manually inspected the data, cleaned the data, and labelled it correctly for processing. The volume of data today, however, has made it infeasible for humans to perform this conventional process. There are simply not enough personnel with the appropriate qualifications to process the data conventionally.

The emergence of big data has prompted research into different ways to analyze, systematically extract information from, or otherwise deal with data sets that are too large or complex to be dealt with by traditional data-processing application software. Big data challenges include capturing data, data storage, data analysis, search, sharing, transfer, visualization, querying, updating, information privacy and data source. Current ways of processing big data are vulnerable to multiple issues, including high reliance on accurate presentation of datasets, limitations to binary features, and vulnerability to overfitting in which an analysis corresponds too closely to a particular set of data resulting in failure to fit additional data or predict future observations reliably. Furthermore, current ways of processing big data present complications for users attempting to calculate a specific feature's influence on the outcome of the data.

Therefore, there exists a need for improvements to data analysis for large datasets in order to provide users with a more efficient manner for determining the accuracy of the data in addition to measuring the influence of a specific feature value on the outcome of the data.

SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a data analysis system utilizing custom unsupervised machine learning processes over a communications network is disclosed, the system comprising a repository of data connected to the communications network, a web application deployed on a web server connected to the communications network, the web application including a data collection interface between the web server and the repository of data, wherein the web application is configured for providing a graphical user interface for modifying, by a user, a plurality of threshold parameters of a clustering algorithm for clustering the data, executing the clustering algorithm with the plurality of threshold parameters that were modified by the user, thereby producing a set of results, providing a graphical user interface for reviewing, by the user, the set of results of the clustering algorithm and re-executing steps a) through c) if the set of results are not useful, copying the set of results into a deep learning software framework and, executing a deep learning algorithm in the deep learning software framework on the set of results, thereby establishing relationships between the data, and providing generalizations of the data.

To the accomplishment of the above and related objects, the claimed subject matter may be embodied in the form illustrated in the accompanying drawings, attention being called to the fact, however, that the drawings are illustrative only, and that changes may be made in the specific construction illustrated and described within the scope of the appended claims. The foregoing and other features and advantages of the claimed subject matter will be apparent from the following more particular description of the preferred embodiments of the claimed subject matter, as illustrated in the accompanying drawings.

BRIEF DESCRIPTION OF THE DRAWINGS

The accompanying drawings, which are incorporated in and constitute part of this specification, illustrate embodiments of the claimed subject matter and, together with the description, serve to explain the principles of the claimed subject matter. The embodiments illustrated herein are presently preferred, it being understood, however, that the claimed subject matter is not limited to the precise arrangements and instrumentalities shown, wherein:

FIG. 5 is a block diagram illustrating a computer system according to exemplary embodiments of the present technology.

DETAILED DESCRIPTION

Figure 1:
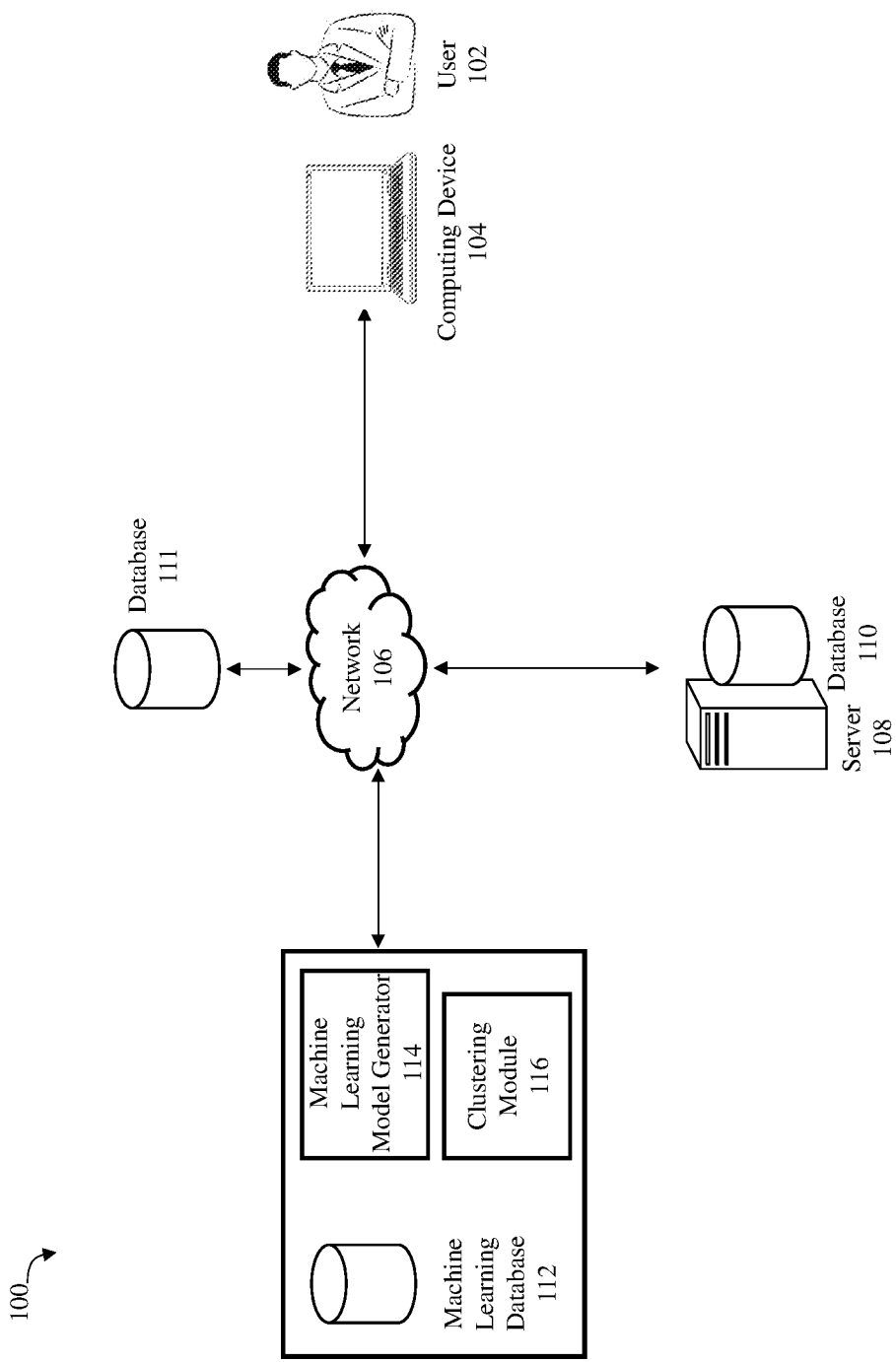
FIG. 1 is a diagram of an operating environment that supports a system for data analysis using artificial intelligence, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for data analysis using artificial intelligence configured to process data sets that are too large or complex to be dealt with by traditional data-processing application software. The disclosed embodiments also improve upon the problems with the prior art by providing a system for data analysis that reduces or eliminates the problems associated with processing big data, such as failure to fit additional data or predict future observations reliably.

The disclosed embodiments further improve upon the problems with the prior art by providing a system for data analysis using artificial intelligence configured to improve filtering for useful data within large datasets by reducing noise and identifying useful data in an unconventional manner that utilizes logistic regression tests on datasets iteratively in order to determine which datasets are useful to train a complex machine learning model. The system improves the accuracy of data utilized for training sets configured for machine learning models by allowing users to establish threshold parameters and iteratively removing data that is below the established threshold parameters. The system also improves visual representations and analytics associated with calculations of data features and their influence on outcomes. Finally, the system improves overall computer performance by reducing the amount of computing resources utilized to generate a trained model that not only makes more accurate predictions on datasets, but also more efficiently establishes relationships between data and provides generalizations of the data.

Referring now to FIG. 1, a system 100 for data analysis using artificial intelligence is depicted. System 100 comprises a user 102 operating on a computing device 104 in which computing device 104 is communicatively coupled to a communications network 106, such as the Internet. System 100 further comprises a server 108 and a data repository 110 (hereinafter referred to as "database") in which server 108 and database 110 are communicatively coupled to the communications network 106. System 100 may further comprise a customer data repository 110 (also hereinafter referred to as "database") communicatively coupled to communications network 106. Customer data repository 110 may house data that belongs to a customer of user 102 and said data may also or alternatively reside in the database 110.

System 100 further comprises a machine learning database 112, a machine learning model generator 114, and a regression and clustering module 116 each of which are communicatively coupled to the communications network 106. In one embodiment, data communicated on network 106 can be implemented using a variety of protocols on a network such as a wide area network (WAN), a virtual private network (VPN), metropolitan area networks (MANs), system area networks (SANs), a public switched telephone network (PTSN), a global Telex network, or a 2G, 3G, 4G or 5G network. Such networks can also generally contextually be referred to herein as the Internet or cloud. Machine learning is the study of computer algorithms that improve automatically through experience. Machine learning is a subset of artificial intelligence that uses algorithms that build a mathematical model based on sample data, also referred to as training data, in order to make predictions or decisions. Machine learning algorithms are used when it is difficult or infeasible to develop conventional algorithms to perform needed tasks.

Machine learning database 112 is a database configured for storing the data structures that are used for machine learning processes, such as storing data models, mathematical models, training data, training examples in array or vector form, etc. Machine learning model generator 114 is a set of routines and/or processes configured for generating models that are trained on training data and then can process additional data. Various types of models can be used for system 100, including artificial neural networks, decision trees, support vector machines, regression analysis, Bayesian networks and genetic algorithms. Regression and clustering module 116 is a set of routines and/or processes configured for conducting regression then cluster analysis. Regression analysis is a set of statistical processes for estimating the relationships between a dependent variable and one or more independent variables. A common form of regression analysis is linear regression, which comprises the discovery of a line that most closely fits the data according to a specific mathematical criterion. Cluster analysis is the task of grouping a set of data or objects in such a way that objects in the same group (called a cluster) are more similar to each other than to those in other groups or clusters. Members of the same cluster are grouped based on one or more metrics indicating that the members of the group share more metric similarities with each other than the members of other groups.

It is to be understood that system 100 and said components may be implemented in hardware, software, or a combination thereof. In some embodiments, the various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of ordinary skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending upon the arrangement.

In one embodiment, computing device 104, server 108 and database 111 may include, but are not limited to, one or more laptop computers, tablet computers, smartphones, desktop computers, internet of things (IOT) devices, servers, workstations, virtual machines, and any other mechanisms used to access networks and software. Computing device 104, server 108 and database 111 (which may include web servers) may be configured to run or host a web application communicatively coupled to network 106. The web application may be configured on a software platform configured to allow user 102 to contribute, monitor, and/or analyze data sets in addition to serving as a mechanism to present graphical user interfaces to user 102 that support receiving inputs from user 102 in order to perform components necessary for server 108 to perform execution of one or more algorithms disclosed herein. In one embodiment, user 102 provides a plurality of user input to computing device 104 in which server 108 receives the plurality of user input over communications network 106 and automatically performs tasks described herein on data housed in databases 110 and/or 111.

In one embodiment, the combination of machine learning database 112, machine learning model generator 114, and regression and clustering module 116 are configured to operate in unison in order to perform tasks such as execution of regression analysis and one or more high quality clustering algorithms in order to efficiently cluster data received by system 100. In one embodiment, machine learning model generator 114 may comprise one or more servers to support execution of applying the regression analysis and clustering algorithms and/or any other applicable algorithms to the data in databases 110, 111. In one embodiment, server 108 accesses databases 110 and/or 111 and data derived from user 102 and other applicable data sources (described in greater detail during discussion of FIG. 2) to machine learning database 112 in order for machine learning model generator 114 to apply the regression analysis and one or more high quality clustering algorithms associated with regression and clustering module 116 to the data. It is to be understood that regression and clustering module 116 supports a plurality of regression analysis algorithms and clustering algorithms including, but not limited to, k-means clustering, k-medoids clustering, Clarans clustering, Birch clustering, Cure clustering, Chameleon clustering, DBScan clustering, an Optics clustering, Denclue clustering, Sting clustering, Clique clustering, Wave-Cluster clustering, or any combinations thereof configured to support machine learning model generator 114 in discovering patterns in the data in order to generate groups in which the members share a significant amount of associations.

Figure 2:
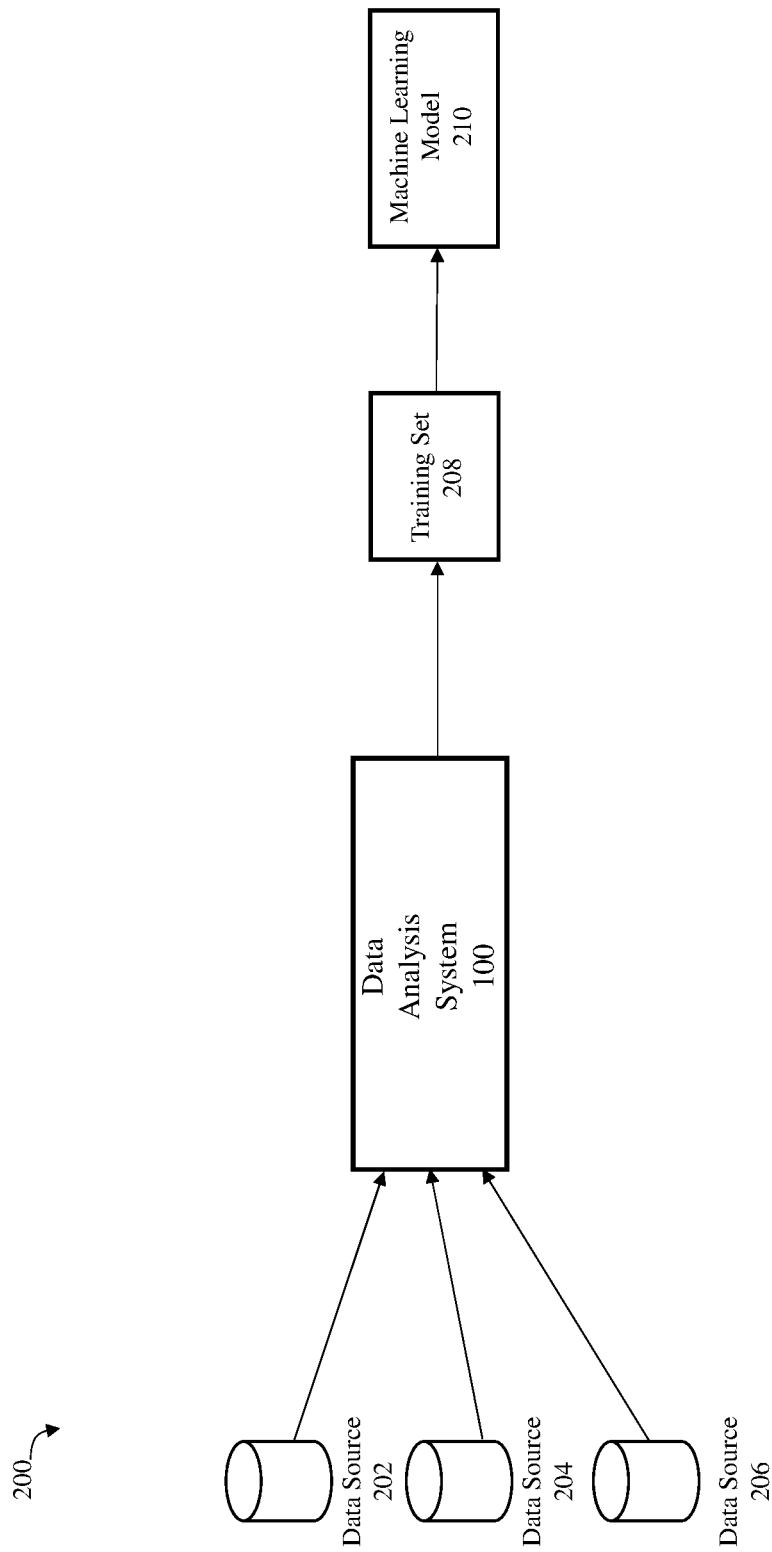
FIG. 2 is a diagram of a machine learning modeling architecture that supports the system for data analysis using artificial intelligence, according to an example embodiment.

Referring now to FIG. 2, a machine learning modeling architecture 200 configured to support the system 100 for data analysis is depicted according to an example embodiment. Architecture 200 comprises a plurality of data sources 202-206 configured to transmit various types of datasets to system 100 in which server 108 serves as the receiving point configured to filter the data received from data sources 202-206 and store components of the data in databases 110 and/or 111. Alternatively, architecture 200 comprises a plurality of data sources 202-206 configured to serve various types of datasets to system 100 in which server 108 downloads or requests said data from data sources 202-206 and stores components of the data in databases 110 and/or 111.

Architecture 200 further comprises one or more training sets 208 (which may be stored in machine learning database 112) comprising a plurality of training instances (training data) configured to comprise a plurality of features (in some instances values associated with each of the features) in which the plurality of features are associated with at least one of the received data or the result of the one or more clustering algorithms and one or more other applicable functions applied to the received data during an iteration.

Architecture 200 further comprises a machine learning model 210 (which may be stored in machine learning database 112 and which may have been produced by machine learning model generator 114) configured to utilize one or more techniques in order to train the model based on at least training set 208. In one embodiment, training set 208 and machine learning model 210 may be comprised in a deep learning software framework in which machine learning software providing generic functionality that can be selectively changed by additional user-written code, thus providing application-specific software. The deep learning software framework provides a standard way to build and deploy machine learning applications and is a universal, reusable software environment that provides particular machine learning functionality as part of a larger software platform to facilitate development of machine learning software applications, products and solutions. The deep learning software framework may include support programs, compilers, code libraries, tool sets, application programming interfaces (APIs) and deep learning algorithms that bring together all the different components to enable development of a machine learning project or system. It is to be understood that machine learning is the study and construction of algorithms that can learn from, and make predictions on data, and that such algorithms operate by building a model from inputs in order to make data-driven predictions or decisions. In particular, machine learning model 210 is trained based on training set 208 representing weights or coefficients of the plurality of features and/or derivatives of the plurality of features. Deep learning is part of a broader family of machine learning methods based on artificial neural networks with representation learning that can be supervised, semi-supervised or unsupervised.

Unsupervised learning (otherwise referred to as unsupervised machine learning) is a type of machine learning algorithm used to draw inferences from datasets consisting of input data without labeled responses. A common unsupervised learning method is cluster analysis, which is used for exploratory data analysis to find hidden patterns or grouping in data. The clusters are modeled using a measure of similarity which is defined upon metrics such as Euclidean or probabilistic distance. The claimed process described herein is considered unsupervised learning or unsupervised machine learning due to the use of cluster analysis.

In one embodiment, server 108, either alone or in combination with architecture 200 is configured to continuously download, receive, filter, compile, and transmit data received from data sources 202-206 and computing device 104 in order for machine learning model generator 114 to perform one or more functions on said data in addition to utilizing regression and clustering module 116 to apply one or more of the aforementioned regression and clustering algorithms to the received data. In one embodiment, server 108 and/or machine learning model generator 114 may iteratively apply one or more logistic regression functions on said data (in combination with the one or more clustering algorithms) in which the clustering algorithms are configured to filter noisy data in order to make said data less noisy, and the logistic regression functions are configured to identify the most useful components of said data. In one embodiment, server 108 and/or machine learning model generator 114 are configured to execute a plurality of logistical regression tests on said data in order to determine which components of said data are useful to include in training set 208 in order to train machine learning model 210.

In one embodiment, server 108 applies one or more logistic regression tests at each iteration for said data in order to determine which components of said data are considered useful enough to be included in training set 208. For example, for each feature of the plurality of features in each iteration, a regression model may be applied to the applicable feature in order to calculate the influence of the applicable feature on the overall outcome/output of the data after the one or more aforementioned algorithms are applied during the iteration. The application of the multiple logistic regression tests at each iteration increases the accuracy of the datasets overall in addition to ensuring that said data is useful enough to be included in training set 208 in order to provide more accurate predictions. In other words, it is possible for clustering algorithms and other applicable algorithms, such as those associated with logistic regression tests, to be applied to said data or the resulting data of the most recent iteration. Each logistic regression test may also calculate a metric of influence that measures the rank or quantifies the influence of each feature of the data.

Logistic regression is a statistical model configured to be utilized in order to model the probability of a certain class or event existing. Traditionally, logistic regression models are represented by utilizing weights or coefficient values to predict an output value typically modeled as a binary value. The combination of clustering and linear regression may be utilized in order to remove noise from data and identify useful data for training a complex machine learning model. The claimed process described herein is considered machine learning logistic regression due to the use of regression analysis in a machine learning environment. Logistic regression may also be used to calculate functional data within the data being processed, wherein functional data comprises data providing information about curves, surfaces or anything else varying over a continuum.

In one embodiment, server 108 is also configured to provide a graphical user interface to computing device 104 over network 106 prompting user 102 for a plurality of threshold parameters (or modifications to said threshold parameters) configured to indicate the type, nature and amount of said data that will be included in training set 208. Server 108 is configured to allocate a plurality of scores among the features of the data collected and processed (as defined above), wherein after each iteration, certain data are removed from the dataset resulting in a more accurate dataset. In one embodiment, server 108 provides functionality configured to allow user 102 to modify or toggle the plurality of threshold parameters in order for user 102 to tune the data based on his or her preferences. For example, the applicable threshold parameter of the plurality of threshold parameters set by user 102 for the applicable iteration ensures that the data or applicable feature comprising a score that is lower than the applicable threshold parameter is removed from the overall dataset; thus, preventing the applicable feature from being included in the following iteration and ultimately increasing the accuracy of the dataset overall. In one embodiment, user 102 may reset or adjust a plurality of hyperparameters associated with the set of results in order to increase the accuracy of the set of results or subsequent sets of results.

It is to be understood that the web application provided by server 108 on computing device 104 is configured to allow user 102 to view the results after each iteration (of the processes undertaken by the machine learning modeling architecture 200, as defined above) in order to not only effectively evaluate the utility of the algorithms applied during the applicable iteration, but also provide user 102 with the opportunity to adjust or toggle the plurality of threshold parameters if necessary. Furthermore, the aforementioned feature provides user 102 with the opportunity to scrutinize both the features associated with the lower scores (scores below the applicable threshold parameter) and the effect of a particular feature on the results of an iteration and/or the dataset overall. Threshold parameters may comprise a plurality of numerical values, wherein each numerical value comprises a decimal number.

Figure 3:
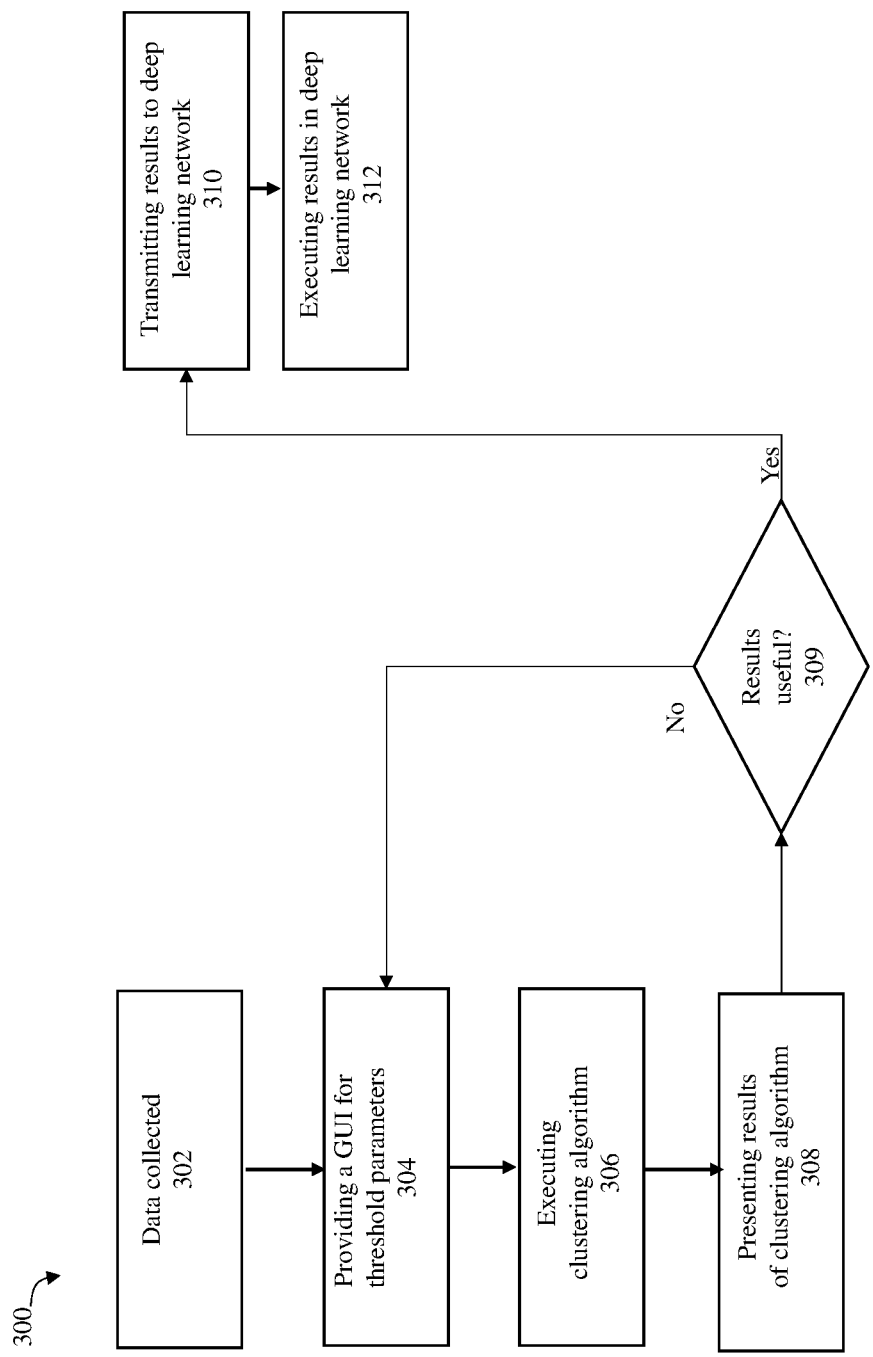
FIG. 3 is a flow chart illustrating a first process flow of the system for data analysis using artificial intelligence, according to an example embodiment.

Referring now to FIG. 3, a flow chart 300 illustrating a first exemplary process of data analysis using artificial intelligence is depicted. At step 302, server 108 accesses database 110, database 111 and/or data sources 202-206 in order to collect data on which data analysis must be performed. It is to be understood that server 108 is designed and configured to download, request, receive, collect, filter, and compile various types of data derived from various data sources prior to performing the subsequent steps provided in this disclosure. Server 108 may continuously perform step 302 while simultaneously performing the subsequent provided steps in order to ensure that data is continuously being feed into system 100. Any data that is collected by server 108 may be stored in database 1110 and/or database 111 and may be referred to herein as "said data".

At step 304, server 108 provides a graphical user interface to computing device 104 over network 106, the interface configured to allow user 102 to provide and/or modify a plurality of threshold parameters. Said graphical user interface may also be supportive in the sense that is suggests a plurality of threshold parameters or changes to an existing plurality of threshold parameters. In one embodiment, when suggesting changes to the plurality of threshold parameters, server 108 may take into account various factors associated with said data such as source of the data, computational demands required in order to process said data, pre-existing user preferences stored within databases 110 and/or 111, or any other applicable factors.

At step 306, server 108 utilizes architecture 200 to execute one or more high quality clustering algorithms in addition to logistic regression tests to said data. It is to be understood that the plurality of threshold parameters serves the purpose of determining the amount of data that is to be included in training set 208. However, machine learning model generator 114 may be continuously receiving data from server 108 and iteratively applying the aforementioned algorithms to the data set while simultaneously removing data and features of data associated with the scores that are less than the threshold parameters. In other words, at each iteration, the clustering algorithms and logistic regression tests are applied to the data and after the application of the aforementioned, the data associated with one or more scores lower than the corresponding threshold parameter are removed, thereby producing a set of results.

At step 308, server 108 provides a graphical user interface to computing device 104 over network 106 providing user 102 with an opportunity to not only review the set of results, but also adjust or toggle the plurality of threshold parameters, if necessary, based on the set of results. If user 102 decides in step 309 to adjust or toggle the plurality of threshold parameters, then steps 304-308 are re-executed and server 108 (using architecture 200) re-executes the aforementioned algorithms and removes the applicable features of data based upon the new plurality of threshold parameters. If user 102 decides in step 309 that the resulting data is useful, then control flows to step 310.

At step 310, server 108 and/or user 102 arrive at a determination that the set of results (accuracy of the data) is adequate enough to be included into training set 208, server 108 copies the resulting data to the deep learning software framework comprising training set 208 and machine learning model 210. At step 312, the set of results manifested via training set 208 are used to train machine learning model 210. In one embodiment, training set 208 comprises multiple training instances associated with the set of results and in some embodiments the training instances comprise a label. In one embodiment, different sets of training data may be based on different features. In one embodiment, machine learning model 210 is configured to capture the correlation between features of the set of results and the labels associated with the training instances. Each feature represents a measurable piece of data that can be used for analysis. Features may also be referred to as variables or attributes. The features included in the dataset can vary widely.

As explained above, a graphical user interface may be configured to present the set of results of each iteration of the aforementioned steps to user 102. In one embodiment, the graphical user interface may provide user 102 with the option to toggle the plurality of threshold parameters in order to effectively target one or more components of the dataset. It is to be understood that execution of the aforementioned steps results in relationships being established between the data and due to the increased accuracy of the data more efficient generalizations of the data are provided to user 102 as well. Relationships between data are defined as a connection between two or more pieces of data, such as a causal relationship connection or a correlated relationship connection. Generalizations about data are defined as true statements that may be made about two or more pieces of data, such as a category, or classification. Generalizations posit the existence of a domain or set of data elements, as well as one or more common characteristics shared by those data elements. The web application may also be configured for generating a downloadable report comprising the set of results for review by the user.

Figure 4:
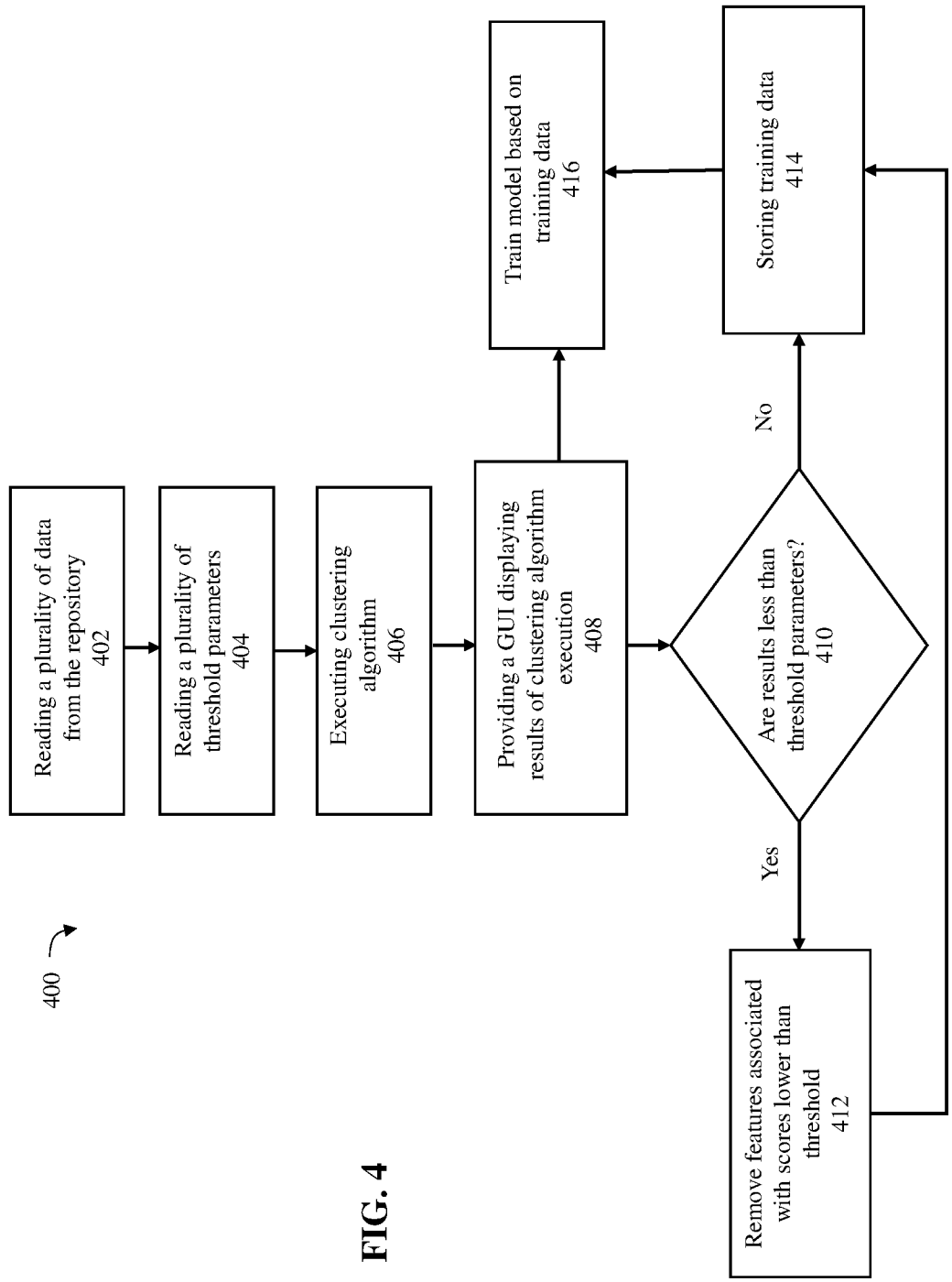
FIG. 4 is a flow chart illustrating a second process flow of the system for data analysis using artificial intelligence, according to an example embodiment.

Referring now to FIG. 4, a flow chart 400 illustrating a second exemplary process of data analysis using artificial intelligence is depicted. At step 402, a plurality of data is read by server 108 from plurality of sources 202-206 and/or databases 110, 111 are accessed by server 108 in order to retrieve data. At step 404, server 108 reads the plurality of threshold parameters from user 102 via inputs on computing device 104. At step 406, the one or more clustering algorithms in addition to the logistic regression tests are performed by server 108 on the plurality of data resulting in a plurality of data clusters or groups.

At step 408, server 108 provides a graphical user interface to computing device 104 allowing user 102 to review the set of results associated with the most recent iteration and/or a compilation of the rendered iterations. If there is a lack of scores that are beneath the applicable threshold parameter, then data may not be removed and training set 208 will represent instances of the current dataset and be used to train machine learning model 210. It is to be understood that training set 208 comprising instances associated with the current dataset may be utilized within machine learning model 210 while server 108 is simultaneously running iterations of applying the algorithms and removing data associated with components of the data that are scored lower than the threshold parameter. This configuration allows for continuous processing of new or altered data by server 108 while allowing machine learning model 210 to continuously receive data and make predictions based on the dataset at each iteration. The set of results may comprise a plurality of scores associated with each of a plurality of features associated with the data that was analyzed.

At step 410, server 108 assumes that there is at least one remaining score that is lower than the threshold parameter and makes a determination regarding which feature is associated with the at least one remaining score. If the feature is in fact associated with the at least one remaining score, then step 412 occurs and the feature is removed from the dataset. Otherwise, the process proceeds directly to step 414 in which components of the dataset are stored into training set 208. At step 416, machine learning model 210 is trained based on training set 208. It is to be understood that none of the aforementioned steps are required to be performed in a particular order and variations are possible; however, it is important for server 108 to receive a threshold parameter or establish a default threshold parameter in order for features to be removed from the dataset based on said threshold parameter.

FIG. 5 is a block diagram of a system including an example computing device 500 and other computing devices. Consistent with the embodiments described herein, the aforementioned actions performed by various components of system 100 (such as devices 112, 114, 116, 111, 108 and 104) may be implemented in a computing device, such as computing device 500. Any suitable combination of hardware, software, or firmware may be used to implement computing device 500. The aforementioned system, device, and processors are examples and other systems, devices, and processors may comprise the aforementioned computing device. Furthermore, computing device 500 may comprise an operating environment for system 100. Processes, data related to system 100 may operate in other environments and are not limited to computing device 500.

A system consistent with an embodiment of the claimed subject matter may include a plurality of computing devices, such as a computing device 500 of FIG. 5. In a basic configuration, computing device 500 may include at least one processing unit 502 and a system memory 504. Depending on the configuration and type of computing device, system memory 504 may comprise, but is not limited to, volatile (e.g. random-access memory (RAM)), nonvolatile (e.g. read-only memory (ROM)), flash memory, or any combination or memory. System memory 504 may include operating system 502, and one or more programming modules 506. Operating system 502, for example, may be suitable for controlling computing device 500's operation. Furthermore, embodiments of the claimed subject matter may be practiced in conjunction with a graphics library, other operating systems, or any other application program and is not limited to any particular application or system. This basic configuration is illustrated in FIG. 5 by those components within a dashed line 520.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of system 500. Computing device 500 may also have input device(s) 512 such as a keyboard, a mouse, a pen, a sound input device, a camera, a touch input device, etc. Output device(s) 514 such as a display, speakers, a printer, etc. may also be included. The aforementioned devices are only examples, and other devices may be added or substituted.

Computing device 500 may also contain a network connection device 515 that may allow device 500 to communicate with other computing devices 518, such as over a network in a distributed computing environment, for example, an intranet or the Internet. Device 515 may be a wired or wireless network interface controller, a network interface card, a network interface device, a network adapter, or a LAN adapter. Device 515 allows for a communication connection 516 for communicating with other computing devices 518. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 504, including operating system 502. While executing on processing unit 502, programming modules 506 (e.g. program module 507) may perform processes including, for example, one or more of the stages of a process. The aforementioned processes are examples, and processing unit 502 may perform other processes. Other programming modules that may be used in accordance with embodiments of the claimed subject matter may include electronic mail and contacts applications, word processing applications, spreadsheet applications, database applications, slide presentation applications, drawing or computer-aided application programs, etc.

Generally, consistent with embodiments of the claimed subject matter, program modules may include routines, programs, components, data structures, and other types of structures that may perform particular tasks or that may implement particular abstract data types. Moreover, embodiments of the claimed subject matter may be practiced with other computer system configurations, including hand-held devices, multiprocessor systems, microprocessor-based or programmable consumer electronics, minicomputers, mainframe computers, and the like. Embodiments of the claimed subject matter may also be practiced in distributed computing environments where tasks are performed by remote processing devices that are linked through a communications network. In a distributed computing environment, program modules may be located in both local and remote memory storage devices.

Furthermore, embodiments of the claimed subject matter may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the claimed subject matter may also be practiced using other technologies capable of performing logical operations such as, for example, AND, OR, and NOT, including but not limited to mechanical, optical, fluidic, and quantum technologies. In addition, embodiments of the claimed subject matter may be practiced within a general-purpose computer or in any other circuits or systems.

Embodiments of the claimed subject matter, for example, are described above with reference to block diagrams and/or operational illustrations of methods, systems, and computer program products according to embodiments of the claimed subject matter. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the claimed subject matter have been described, other embodiments may exist. Furthermore, although embodiments of the claimed subject matter have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A data analysis system utilizing custom unsupervised machine learning processes over a communications network, the system comprising:
    a database connected to the communications network;
    a web server comprising a memory and a processor, the web server connected to database and to the communications network;
    a web application deployed on the web server, the web application including a data collection interface between the web server and the database of data, wherein the web application is configured for:
    a) receiving input from a user via a graphical user interface, the input comprising modifying, by a user, a plurality of threshold parameters of a clustering algorithm for clustering a dataset from the database;
    b) executing, on the dataset, a machine learning logistic regression function configured to calculate a metric of influence for each feature of a plurality of features associated with the dataset;
    c) executing, on the dataset, the clustering algorithm with the plurality of threshold parameters that were modified by the user, thereby producing a current set of results comprising a plurality of scores associated with each feature of the plurality of features associated with the dataset;
    d) identifying data in the dataset with a metric of influence and a plurality of scores below a predefined threshold, wherein said data that was identified is set for removal from the dataset;
    e) removing the data that was identified from the dataset, thereby creating a revised dataset;

f) after producing the current set of results, providing a graphical user interface for the user to adjust the plurality of threshold parameters, wherein if the user adjusts the plurality of threshold parameters, thereby producing an adjusted plurality of threshold parameters, then re-executing steps a) through f) using the adjusted plurality of threshold parameters and the revised dataset, and wherein if the user does not adjust the plurality of threshold parameters, then the revised dataset is deemed a final dataset and the current set of results is deemed a final set of results;

g) copying the final set of results into a deep learning software framework; and h) executing a deep learning algorithm in the deep learning software framework on the final set of results, thereby establishing relationships between the final dataset, and providing generalizations of the final dataset.

2. The data analysis system of claim 1, wherein the clustering algorithm comprises at least a machine learning logistic regression function that is further configured for identifying a set of functional data comprised within the dataset.

3. The data analysis system of claim 2, further comprising:

wherein the plurality of threshold parameters comprises a plurality of numerical values, wherein each numerical value comprises a decimal number.

4. The data analysis system of claim 3, further comprising:

wherein the graphical user interface for the user to adjust the plurality of threshold parameters comprises a supportive graphical user interface.

5. The data analysis system of claim 4, further comprising:

wherein the web application is further configured for generating a downloadable report comprising the final set of results for review by the user.

6. A method for data analysis utilizing custom unsupervised machine learning processes over a communications network, the method comprising:

storing data in a database connected to the communications network;

providing a web server comprising a memory and a processor, the web server connected to database and to the communications network;

providing a web application deployed on the web server, the web application including a data collection interface between the web server and the database, wherein the web application is configured for:

a) receiving input from a user via a graphical user interface, the input comprising modifying, by a user, a plurality of threshold parameters of a clustering algorithm for clustering a dataset from the database;

b) executing, on the dataset, a machine learning logistic regression function configured to calculate a metric of influence for each feature of a plurality of features associated with the dataset;

c) executing, on the dataset, the clustering algorithm with the plurality of threshold parameters that were modified by the user, thereby producing a current set of results comprising a plurality of scores associated with each feature of the plurality of features associated with the dataset;

d) identifying data in the dataset with a metric of influence and a plurality of scores below a predefined threshold, wherein said data that was identified is set for removal from the dataset;

e) removing the data that was identified from the dataset, thereby creating a revised dataset;

f) after producing the current set of results, providing a graphical user interface for the user to adjust the plurality of threshold parameters, wherein if the user adjusts the plurality of threshold parameters, thereby producing an adjusted plurality of threshold parameters, then re-executing steps a) through f) using the adjusted plurality of threshold parameters and the revised dataset, and wherein in response to a user review of the current set of results, setting the revised dataset as a final dataset and setting the current set of results as a final set of results;

g) copying the final set of results into a deep learning software framework; and h) executing a deep learning algorithm in the deep learning software framework on the final set of results, thereby establishing relationships between the final dataset, and providing generalizations of the final dataset.

7. The method of claim 6, further comprising:

wherein the clustering algorithm comprises at least a machine learning logistic regression function that is further configured for identifying a set of functional data comprised within the dataset.

8. The data method of claim 7, further comprising:

wherein the plurality of threshold parameters comprises a plurality of numerical values, wherein each numerical value comprises a decimal number.

9. The method of claim 8, further comprising:

wherein the graphical user interface for the user to adjust the plurality of threshold parameters comprises a supportive graphical user interface.

10. The method of claim 9, further comprising:

wherein the web application is further configured for generating a downloadable report comprising the final set of results for review by the user.

* * * * *